United States Patent
Madineni et al.

(10) Patent No.: US 12,224,877 B2
(45) Date of Patent: Feb. 11, 2025

(54) PRESENTATION CONTENT EFFECTIVENESS USING ATTRACTION MODELING

(71) Applicant: INTERNATIONAL BUSINESS MACHINES CORPORATION, Armonk, NY (US)

(72) Inventors: Narayana Aditya Madineni, Ferny Hills (AU); Pranab Agarwal, Oxenford (AU); Chia-Le Cheng, Southport (AU); Jonathan D. Dunne, Dungarvan (IE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 321 days.

(21) Appl. No.: 17/660,237

(22) Filed: Apr. 22, 2022

(65) Prior Publication Data
US 2023/0344665 A1  Oct. 26, 2023

(51) Int. Cl.
*H04L 12/18*    (2006.01)
*G06Q 10/10*    (2023.01)
*H04L 65/401*    (2022.01)

(52) U.S. Cl.
CPC ....... *H04L 12/1831* (2013.01); *G06Q 10/103* (2013.01); *H04L 12/1822* (2013.01); *H04L 65/401* (2022.05)

(58) Field of Classification Search
CPC .............. H04L 12/1831; H04L 65/401; H04L 12/1822; G06Q 10/103
See application file for complete search history.

(56) References Cited

U.S. PATENT DOCUMENTS 9,646,198 B2   5/2017   Cunico
10,977,484 B2   4/2021   Khanna
(Continued)

OTHER PUBLICATIONS

Buechel, et al., "Emotion Analysis as a Regression Problem—Dimensional Models and Their Implications on Emotion Representation and Metrical Evaluation", ResearchGate, Conference Paper—Aug. 2016, 10 pgs., ECAI, 2016, pp. 1114-1122. https://www.researchgate.net/publication/307512566_Emotion_Analysis_as_a_Regression_Problem_-Dimensional_Models_and_Their_Implications_on_Emotion Representation_and_Metrical_Evaluation.
(Continued)

*Primary Examiner* — Raqiul A Choudhury
(74) *Attorney, Agent, or Firm* — Robert R. Aragona

(57) ABSTRACT

An embodiment for determining presentation content effectiveness using attraction modeling is provided. The embodiment may include receiving presentation content from a meeting host during on online collaborative meeting. The embodiment may also include capturing one or more actions of one or more users during a display of the presentation content to the one or more users. The embodiment may further include creating an audience attention model. The embodiment may also include in response to determining at least one user is distracted from the presentation content, modifying the display of the presentation content for each distracted user in accordance with one or more characteristics associated with each distracted user. The embodiment may further include categorizing the one or more users into one or more groups. The embodiment may also include providing visual feedback to the meeting host.

20 Claims, 7 Drawing Sheets

(56) References Cited

U.S. PATENT DOCUMENTS

| | | | |
|---|---|---|---|
| 2008/0098067 A1* | 4/2008 | O'Sullivan | G06Q 10/109 |
| | | | 709/204 |
| 2008/0320082 A1* | 12/2008 | Kuhlke | H04L 12/1822 |
| | | | 709/205 |
| 2014/0123027 A1* | 5/2014 | Kozloski | G06Q 10/1095 |
| | | | 715/753 |
| 2014/0150002 A1* | 5/2014 | Hough | H04N 21/4532 |
| | | | 725/9 |
| 2016/0150072 A1* | 5/2016 | Rangarajan | H04W 52/0254 |
| | | | 455/574 |
| 2018/0157321 A1* | 6/2018 | Liu | G06V 40/16 |
| 2018/0227343 A1 | 8/2018 | Borghetti | |
| 2021/0176429 A1 | 6/2021 | Peters | |
| 2021/0264929 A1 | 8/2021 | Osebe | |
| 2022/0385491 A1* | 12/2022 | Morris | H04L 12/1822 |
| 2023/0261894 A1* | 8/2023 | Srivastava | G06V 40/20 |
| | | | 709/204 |

OTHER PUBLICATIONS

Mell et al., "The NIST Definition of Cloud Computing", Recommendations of the National Institute of Standards and Technology, NIST Special Publication 800-145, Sep. 2011, 7 pages.

Disclosed Anonymously, "A method to adjust audience interest in online activities based on sentiment analysis", IPCOM000263018D, Jul. 23, 2020, 3 Pages. https://ip.com/IPCOM/000263018.

* cited by examiner

300

350

PRESENTATION CONTENT EFFECTIVENESS USING ATTRACTION MODELING

BACKGROUND

The present invention relates generally to the field of computing, and more particularly to a system for determining presentation content effectiveness using attraction modeling.

Video conferencing through a variety of desktop and mobile collaborative meeting applications, as well as collaborative meeting browser extensions, has become an effective interaction and communication tool that enables both small and large-scale companies to reduce travel and operational costs incurred in conducting in-person meetings. Demand for remote workforce management using these collaborative meeting applications has increased steadily in recent years due to rapid globalization. Such software is extremely helpful in bridging the distance between individuals in these small and large-scale companies and allowing them to view presented content in real-time. Unprecedented growth in telemedicine, development of startup ecosystems, and increased numbers of students completing degrees online in both developed and emerging economies are expected to continue the demand for these collaborative meeting tools in the coming decades.

SUMMARY

According to one embodiment, a method, computer system, and computer program product for determining presentation content effectiveness using attraction modeling is provided. The embodiment may include receiving presentation content from a meeting host during on online collaborative meeting. The embodiment may also include capturing one or more actions of one or more users during a display of the presentation content to the one or more users. The embodiment may further include creating an audience attention model based on the captured one or more actions. The embodiment may also include in response to determining at least one user is distracted from the presentation content based on the at least one user exceeding a threshold distraction level, modifying the display of the presentation content for each distracted user in accordance with one or more characteristics associated with each distracted user. The embodiment may further include categorizing the one or more users into one or more groups based on a profession type and experience level of the one or more users. The embodiment may also include providing visual feedback to the meeting host. The provided visual feedback may include a normalized attention score for each user in the one or more groups.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
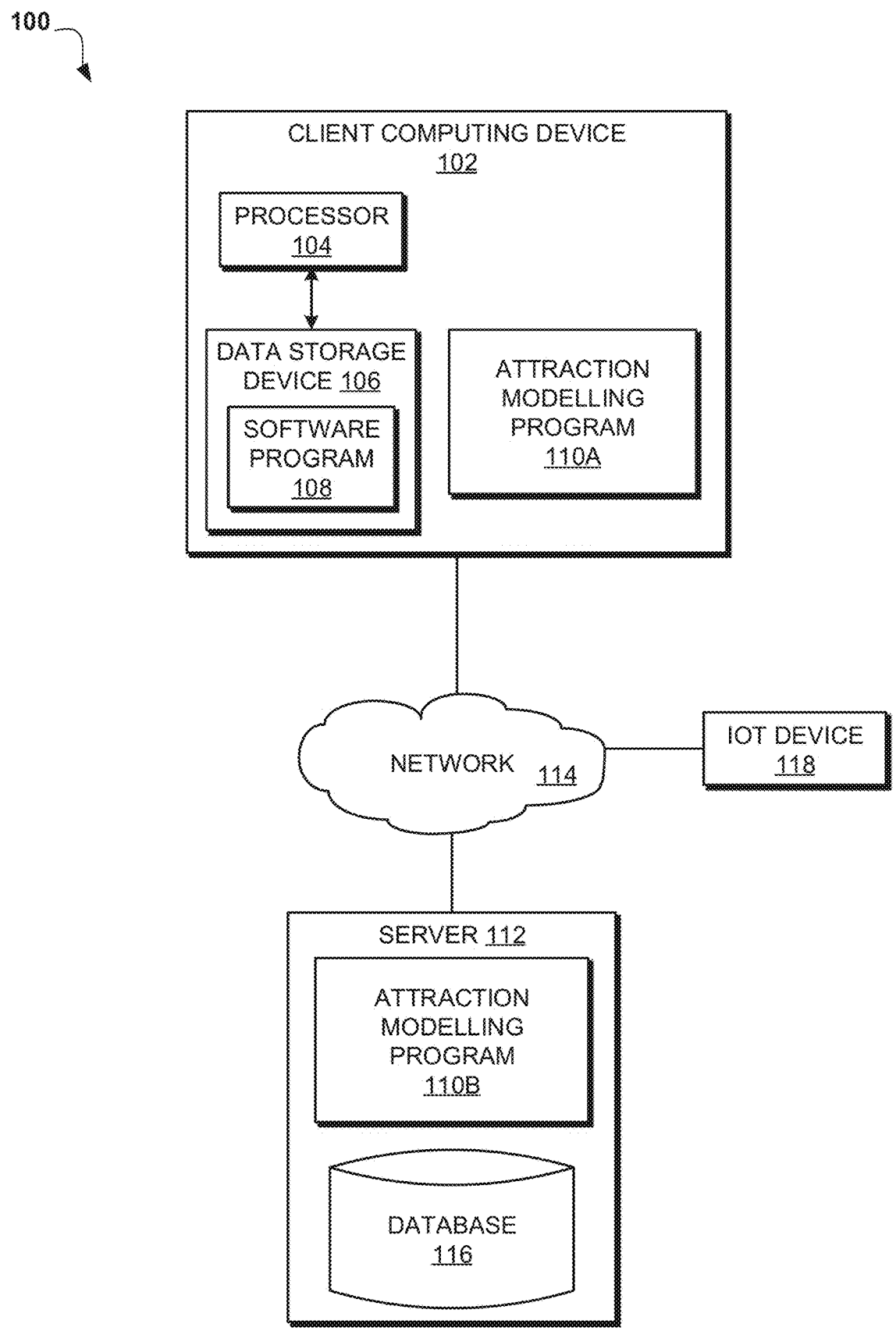
FIG. 1 illustrates an exemplary networked computer environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

It is to be understood that the singular forms "a," "an," and "the" include plural referents unless the context clearly dictates otherwise. Thus, for example, reference to "a component surface" includes reference to one or more of such surfaces unless the context clearly dictates otherwise.

Embodiments of the present invention relate to the field of computing, and more particularly to a system for determining presentation content effectiveness using attraction modeling. The following described exemplary embodiments provide a system, method, and program product to, among other things, create an audience attention model based on captured user actions and, accordingly, modify a display of presentation content based on characteristics of users belonging to a group. Therefore, the present embodiment has the capacity to improve the technical field of e-conferencing applications by dynamically tailoring presentation content to what is most relevant to a particular group of users, thus making online collaborative meetings more efficient.

As previously described, video conferencing through a variety of desktop and mobile collaborative meeting applications, as well as collaborative meeting browser extensions, has become an effective interaction and communication tool that enables both small and large-scale companies to reduce travel and operational costs incurred in conducting in-person meetings. Demand for remote workforce management using these collaborative meeting applications has increased steadily in recent years due to rapid globalization. Such software is extremely helpful in bridging the distance between individuals in these small and large-scale companies and allowing them to view presented content in real-time. Unprecedented growth in telemedicine, development of startup ecosystems, and increased numbers of students completing degrees online in both developed and emerging economies are expected to continue the demand for these collaborative meeting tools in the coming decades. It is often difficult to properly engage a large audience in such online collaborative meetings with relevant content. For example, a group of users of a certain profession and experience level may have different preferences than another group of a different profession and experience level. This problem is typically addressed by determining a sentiment of an attendee and presenting that sentiment to the meeting host. However, determining the sentiment of an attendee may not relate to the effectiveness of the presentation content itself.

It may therefore be imperative to have a system in place to provide the meeting host with feedback about the engagement of a virtual audience and tailor presentation content to what is most relevant to a particular group of users. Thus, embodiments of the present invention may provide advantages including, but not limited to, providing feedback to a meeting host about what content is most relevant to different groups, displaying different presentation content to different groups of users, and allowing a meeting host to customize their presentation content for future meetings. The present invention does not require that all advantages need to be incorporated into every embodiment of the invention.

According to at least one embodiment, when a meeting host is giving a presentation, presentation content may be received from the meeting host during an online collaborative meeting. One or more actions of one or more users may be captured in order to create an audience attention model based on the captured one or more actions. According to at least one embodiment, the captured action may be an eye movement pattern of the one or more users. According to at least one other embodiment, the captured action may be text entered into a chat window by the one or more users. According to at least one further embodiment, the captured action may be context switching by the one or more users. In response to determining at least one user is distracted from the presentation content based on the at least one user exceeding a threshold distraction level, the display of the presentation content may be modified for each distracted user in accordance with one or more characteristics associated with each distracted user. The one or more users may then be categorized into one or more groups based on a profession type and experience level of the one or more users so that visual feedback may be provided to the meeting host. The provided visual feedback may include a normalized attention score for each user in the one or more groups.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed concurrently or substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method, and program product to create an audience attention model based on captured user actions and, accordingly, modify a display of presentation content based on characteristics of users belonging to a group.

Referring to FIG. 1, an exemplary networked computer environment 100 is depicted, according to at least one embodiment. The networked computer environment 100 may include client computing device 102, a server 112, and Internet of Things (IoT) Device 118 interconnected via a communication network 114. According to at least one implementation, the networked computer environment 100 may include a plurality of client computing devices 102 and servers 112, of which only one of each is shown for illustrative brevity.

The communication network 114 may include various types of communication networks, such as a wide area network (WAN), local area network (LAN), a telecommunication network, a wireless network, a public switched network and/or a satellite network. The communication network 114 may include connections, such as wire, wireless communication links, or fiber optic cables. It may be appreciated that FIG. 1 provides only an illustration of one implementation and does not imply any limitations with regard to the environments in which different embodiments may be implemented. Many modifications to the depicted environments may be made based on design and implementation requirements.

Client computing device 102 may include a processor 104 and a data storage device 106 that is enabled to host and run a software program 108 and an attraction modelling program 110A and communicate with the server 112 and IoT Device 118 via the communication network 114, in accordance with one embodiment of the invention. Client computing device 102 may be, for example, a mobile device, a telephone, a personal digital assistant, a netbook, a laptop computer, a tablet computer, a desktop computer, or any type of computing device capable of running a program and accessing a network. As will be discussed with reference to FIG. 4, the client computing device 102 may include internal components 402a and external components 404a, respectively.

The server computer 112 may be a laptop computer, netbook computer, personal computer (PC), a desktop computer, or any programmable electronic device or any network of programmable electronic devices capable of hosting and running an attraction modelling program 110B and a database 116 and communicating with the client computing device 102 and IoT Device 118 via the communication network 114, in accordance with embodiments of the invention. As will be discussed with reference to FIG. 4, the server computer 112 may include internal components 402b and external components 404b, respectively. The server 112 may also operate in a cloud computing service model, such as Software as a Service (SaaS), Platform as a Service (PaaS), or Infrastructure as a Service (IaaS). The server 112 may also be located in a cloud computing deployment model, such as a private cloud, community cloud, public cloud, or hybrid cloud.

IoT Device 118 may be eye tracking sensors, an augmented reality (AR) device, such as smart glasses, a microphone embedded in or external to the client computing device 102, and/or any other IoT Device 118 known in the art for tracking body movement and/or capturing audio output that is capable of connecting to the communication network 114, and transmitting and receiving data with the client computing device 102 and the server 112.

According to the present embodiment, the attraction modelling program 110A, 110B may be a program capable of receiving presentation content from a meeting host during an online collaborative meeting, creating an audience attention model based on captured user actions, modifying the display of presentation content based on characteristics of users belonging to a group, providing feedback to a meeting host about what content is most relevant to different groups, displaying different presentation content to different groups of users, and allowing a meeting host to customize their presentation content for future meetings. The attraction modelling method is explained in further detail below with respect to FIG. 2.

Figure 2:
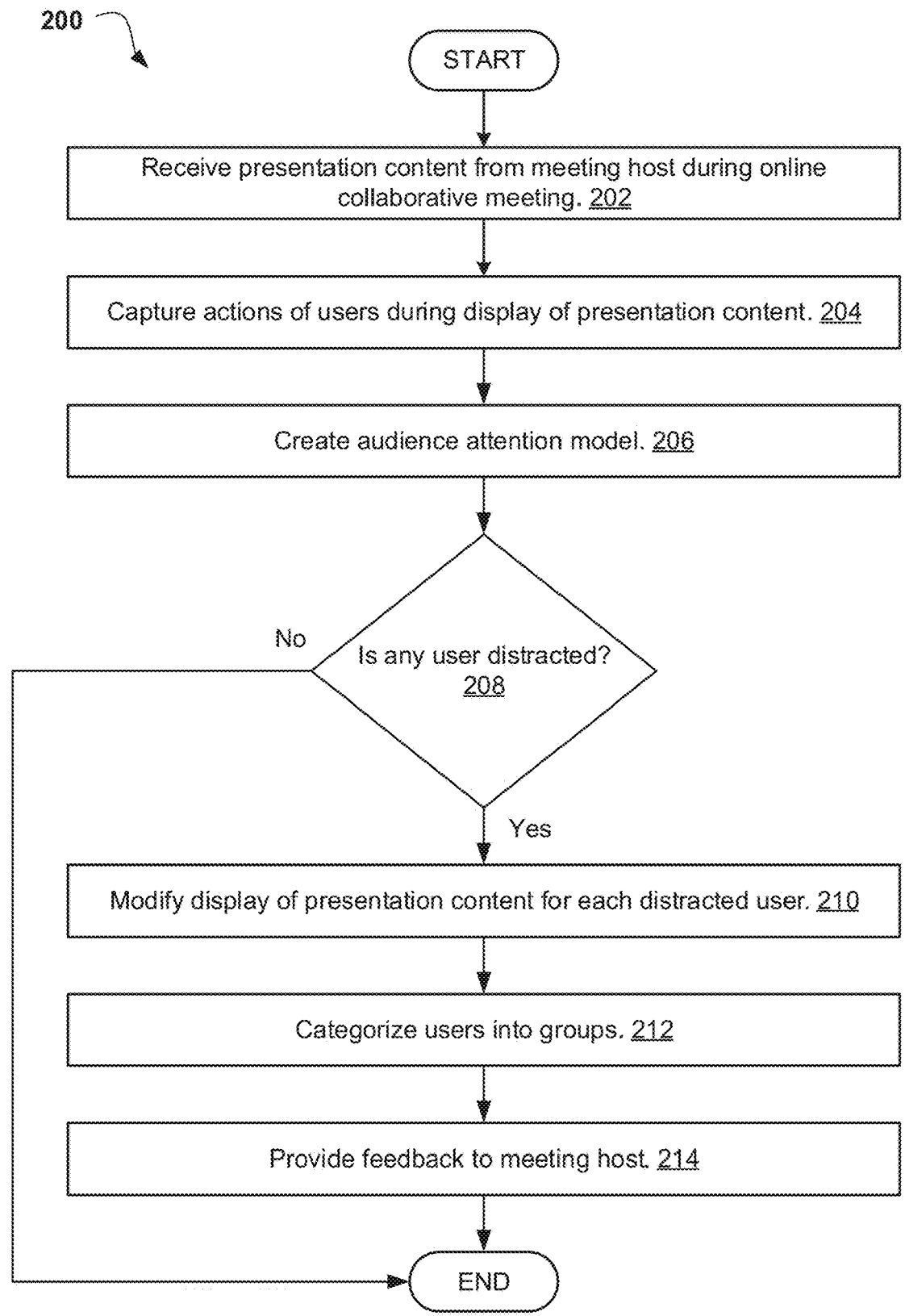
FIG. 2 illustrates an operational flowchart for determining the effectiveness of presentation content during an online collaborative meeting in a collaborative meeting attraction modelling process according to at least one embodiment.

Referring now to FIG. 2, an operational flowchart for determining the effectiveness of presentation content during an online collaborative meeting in a collaborative meeting attraction modelling process 200 is depicted according to at least one embodiment. At 202, the attraction modelling program 110A, 110B receives the presentation content from the meeting host during the online collaborative meeting. When using an online collaborative meeting application, such as Cisco Webex® (Cisco Webex and all Cisco Webex-based trademarks and logos are trademarks or registered trademarks of Cisco Systems, Inc. and/or its affiliates), a meeting host may display presentation content to a virtual audience, i.e., the one or more users. Utilizing the software program 108, the meeting host may upload the presentation content to be displayed to the one or more users. For example, Walter may be the meeting host in a company meeting on sales results for the first quarter of the calendar year. Walter's presentation content may be in slide format, and individual slides "1," "2," "3," "4," and so on may be displayed to the one or more users sequentially. It may be appreciated that the example described above is not intended to be limiting, and that in embodiments of the present invention the presentation content may be in a variety of different formats, including textual and/or graphical format.

Then, at 204, the attraction modelling program 110A, 110B captures the one or more actions of the one or more users during the display of the presentation content to the one or more users. The one or more actions may include, but are not limited to, an eye movement pattern of the one or more users, text entered into a chat window by the one or more users, questions asked by the one or more users, noises made by the one or more users, and content switching by the one or more users. These data inputs may be utilized by the attraction modelling program 110A, 110B to create the audience attention model and determine whether at least one user is distracted from the presentation content, described in further detail below with respect to steps 206 and 208, respectively.

According to at least one embodiment, the eye movement pattern of the one or more users may be tracked by eye tracking sensors embedded in the client computing device 102. According to at least one other embodiment, the eye movement pattern may be tracked by the AR device, such as smart glasses, when the one or more users are wearing such an AR device. The eye movement pattern may be used to determine whether a user is engaged with the presentation content (i.e., whether the user is attracted to the presentation content), or whether the user is distracted from the presentation content, such as when the user is looking away from the presentation content.

The text entered into the chat window by the one or more users may include text that is typed and/or spoken into the chat window, as well as questions asked by the one or more users to the meeting host. Many online collaborative meeting applications have a chat window where virtual audience members are able to chat with each other and/or ask the meeting host questions. For example, one user may type in the chat window, "I am not sure what this means." In this example, the user may be considered distracted from the presentation content. Therefore, in embodiments of the present invention, "distracted" means not only disinterested in the presentation content, but also means the presentation content is difficult to understand for at least one user. In another example, another user may type in the chat window, "This material is very informative." In this example, the user may be considered attracted to the presentation content.

According to at least one embodiment, the noises made by the one or more users may include a detected screenshot and/or recording sound emanating from one or more capture applications, including but not limited to a snipping tool, a "print screen" button, and/or a camera application. The sound may be any sound known in the art that indicates the user has captured the presentation content, such as a slide or a bullet point. For example, many smartphone and desktop cameras make a noise when a recording begins or a picture is taken. Continuing the example above where Walter is giving a presentation, the user may take a screenshot of slide "6" with their smartphone. In order to detect the sound, the IoT Device 118, such as a microphone embedded in or external to the client computing device 102, may be deployed and integrated with the attraction modelling program 110A, 110B. In another example, the user may press the print screen button on their PC and the OS may output a sound which may be received by the IoT Device 118. A screen capture of the presentation content may indicate that the user is attracted to the presentation content. According to at least one other embodiment, the noises made may include a tapping on the keyboard by the one or more users. The tapping may indicate that the user is not engaged with the presentation content and thus is distracted from the presentation content.

A context switching by the one or more users may include a detected spike in the utilization of one or more mobile and/or desktop applications. The detected spike in utilization may include a spike in opening or closing the one or more mobile and/or desktop applications during a timeframe (e.g., opening a web browser three times in the past twenty minutes). For example, the user may open a web browser in a separate window and browse news articles while the presentation content is being displayed. In this example, the user may be considered distracted from the presentation content.

Next, at 206, the attraction modelling program 110A, 110B creates the audience attention model. The audience attention model is created based on the captured one or more actions described above with respect to step 204. The audience attention model may be utilized by the attraction modelling program 110A, 110B to calculate an attention score for each user of the one or more users. According to at least one embodiment, the attention score is derived by multiplying the numbers obtained from each of the following features: executing topic bundle log likelihood on text in the presentation content and text entered by the one or more users as part of the group chat functionality associated with the collaborative meeting application; determining a term frequency on text in the presentation content and text entered by the one or more users; determining an eye gaze position of the one or more users on the display screen and the length of time that the user has gazed at a particular screen region; calculating a number of bigrams and trigrams in the text of the presentation content and text entered by the one or more users; and executing natural language processing (NLP) on text in a business profile of the one or more users to determine any skills obtained by the one or more users.

Once the attention score is derived for each user, the audience attention model may normalize the attention scores for each user using a normalization formula. The normalization formula may be as follows: X normalized=(X−X minimum)/(X maximum−X minimum), where X minimum and X maximum represent the minimum and maximum values in the data set, respectively, X is the attention score, and X normalized is the normalized value of the attention score. For example, where the attention score for one user derived from the above features is 11.69, and where the minimum value and maximum value in the dataset are 3.65 and 22.78, respectively, X normalized=0.42. Thus, in this example, that user would have a normalized attention score of 0.42. The normalized attention score may be a measure of how attentive or distracted a user is to the presentation content. The scale of the normalized attention score may range from −1 to 1, where −1 is most distracted and 1 is most attentive or attracted. The normalized attention score may be utilized by the attraction modelling program 110A, 110B to determine whether the at least one user is distracted from the presentation content, described in further detail below with respect to step 208.

Then, at 208, the attraction modelling program 110A, 110B determines whether the at least one user of the one or more users is distracted from the presentation content. The determination is made based on the at least one user exceeding the threshold distraction level.

According to at least one embodiment, the threshold distraction level may be any normalized attention score that is zero or less than zero, (i.e., any user having a normalized attention score of zero or a negative number would exceed the threshold distraction level). In this embodiment, for example, if the normalized attention scores for a plurality of users are −0.345, 0.456, −0.872, 0, 0.129, 0.322, 0.111, 0.222, −0.657, 0.156, and 0.734, the users with the normalized attention scores of −0.345, −0.872, −0.657, and 0 may be determined to be distracted.

According to at least one other embodiment, the threshold distraction level may be any normalized attention score that is less than zero, (i.e., any user having a normalized attention score of a negative number would exceed the threshold distraction level). In this embodiment, for example, if the normalized attention scores for a plurality of users are the same as described above, the users with the normalized attention scores of −0.345, −0.872, and −0.657 may be determined to be distracted. It may be appreciated that the examples described above are not intended to be limiting, and that in embodiments of the present invention the threshold distraction level may be any number between −1 and 1.

In response to determining the at least one user is distracted from the presentation content (step 208, "Yes" branch), the collaborative meeting attraction modelling process 200 proceeds to step 210 to modify the display of the presentation content for each distracted user in accordance with the one or more characteristics associated with each distracted user. In response to determining the at least one user is not distracted from the presentation content (step 208, "No" branch), the collaborative meeting attraction modelling process 200 ends.

Next, at 210, the attraction modelling program 110A, 110B modifies the display of the presentation content for each distracted user in accordance with the one or more characteristics associated with each distracted user. Examples of a characteristic of the user include, but are not limited to, an experience level of each distracted user (e.g., a junior associate), a profession type of each distracted user (e.g., a data scientist), and/or a level of education of each distracted user (e.g., a bachelor's degree).

Figure 3A:
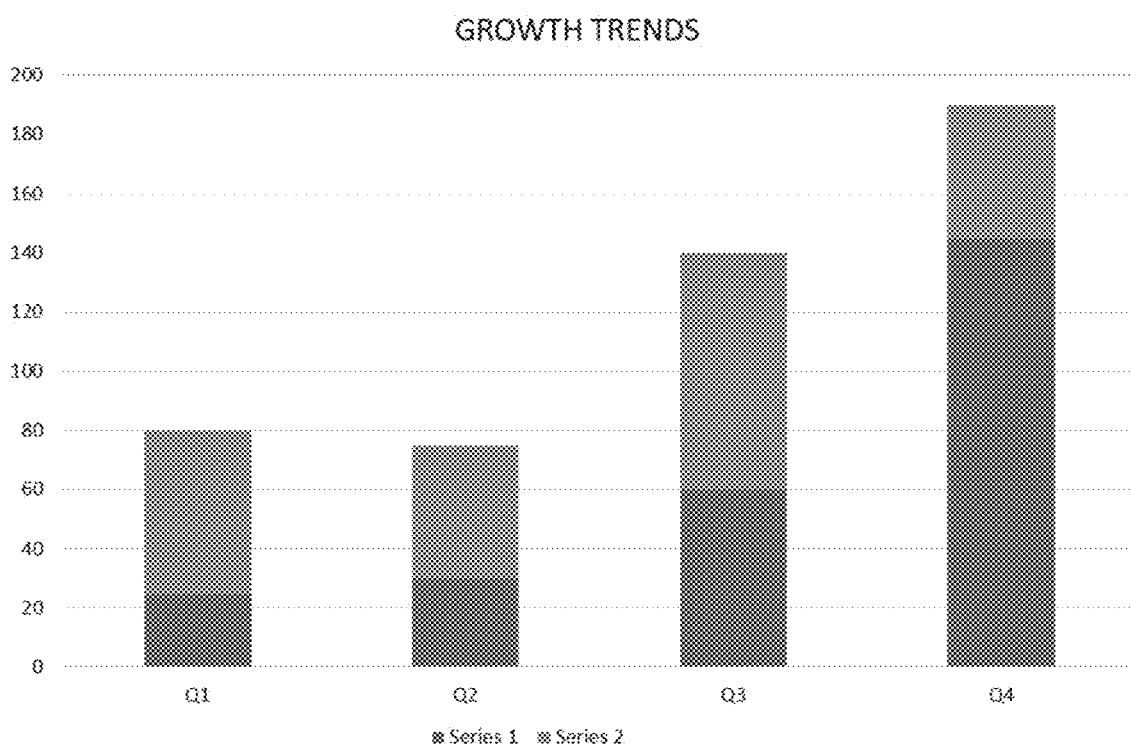
FIG. 3A is a diagram depicting an operational example of statistical information displayed to users in a bar graph during the process in FIG. 2 according to at least one embodiment.
Figure 3B:
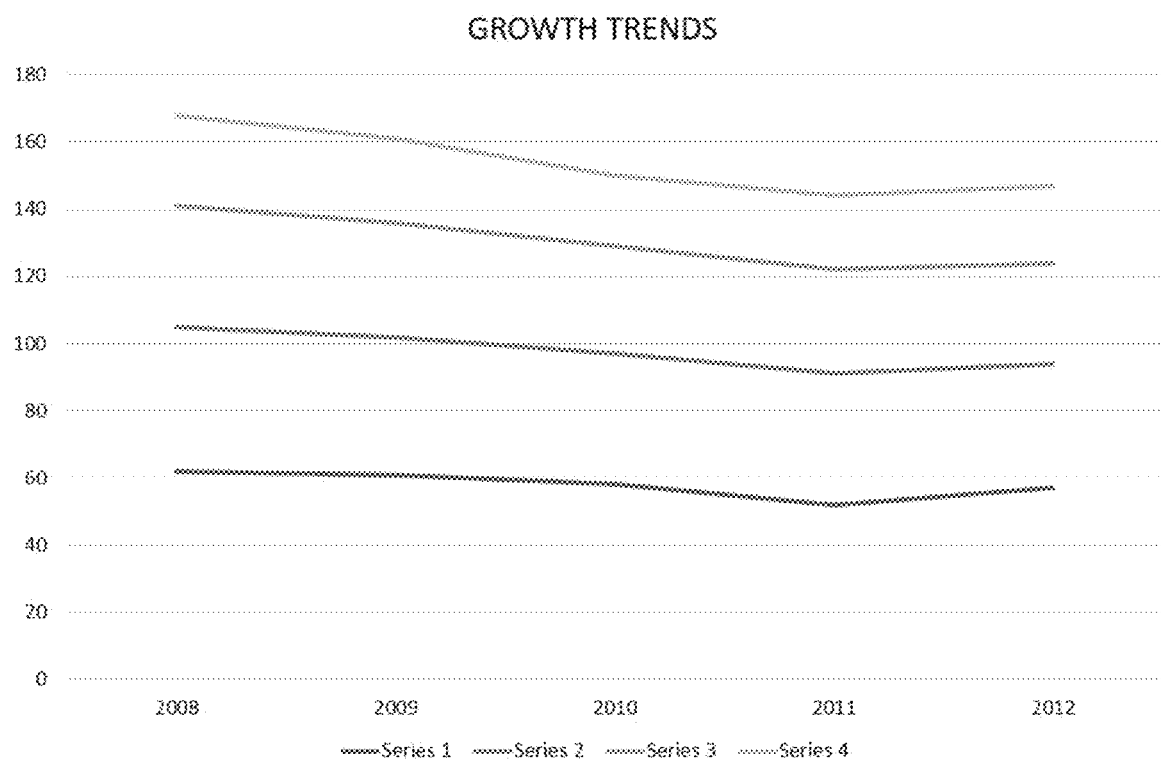
FIG. 3B is a diagram depicting an operational example of statistical information displayed to the users during the process in FIG. 2 upon transformation of the bar graph in FIG. 3A into a line graph according to at least one embodiment.

According to at least one embodiment, the modification includes converting a graph of a first type into a graph of a second type based on the one or more characteristics associated with each distracted user. For example, as illustrated in FIGS. 3A and 3B, a bar graph depicting certain statistical information may be transformed into a line graph. Continuing the example, where the presentation content originally includes a bar graph, a data scientist looking for a more detailed statistical analysis may be shown the bar graph (i.e., there is no modification of the presentation content), whereas a more inexperienced student may be shown the line graph (i.e., there is a modification of the presentation content). In another example, a line graph depicting certain statistical information may be transformed into a bar graph. Thus, embodiments of the present invention may include a manipulation of visual depictions that are displayed to the one or more users.

According to at least one other embodiment, the modification includes converting text of a first type into text of a second type based on the one or more characteristics associated with each distracted user. In this embodiment, a readability score is generated for a particular item of text. For example, the readability score may be generated for a single sentence and/or for a plurality of sentences which form a paragraph. The readability score may be a measure of how easy it is to read the particular item of text and the scale of the readability score may range from 0 to 100, where 0 indicates the text is most difficult to read and 100 indicates the text is easiest to read. The generated readability score may be correlated with the normalized attention score for each distracted user in order to remediate the text of the presentation content. For example, a paragraph with a readability score of 10 may typically take a user who is a college graduate one minute to read, but it is taking this user 90 seconds to read because the user is distracted from the material (i.e., the user has a normalized attention score that exceeds the threshold distraction level). Thus, in this embodiment, the text may be shortened based on the readability score of the paragraph and the normalized attention score of the user such that the user is better able to read the text in the presentation content.

Then, at 212, the attraction modelling program 110A, 110B categorizes the one or more users into one or more groups based on a profession type and experience level of the one or more users. A profession type may be a job title of the one or more users, including but not limited to an executive of a company, a data scientist, a teacher, and/or an engineer. An experience level may be a number indicating a number of years on the job and/or a skill level of the one or more users. For example, an experience level of "1" may indicate that the user is a beginner, whereas an experience level of "10" may indicate that the user is advanced in their field. Users having the same profession type and experience level may be placed into the same group by the attraction modelling program 110A, 110B. For example, a plurality of engineers with an experience level of "6" may be placed into the same group. Similarly, a plurality of teachers with an experience level of "8" may be placed into the same group.

Next, at 214, the attraction modelling program 110A, 110B provides the visual feedback to the meeting host. The provided visual feedback may include the normalized attention score for each user in the one or more groups. According to at least one embodiment, the provided visual feedback may be displayed to the meeting host in a line graph, such as a time/series line graph. Thus, in this embodiment, the meeting host is presented with real-time feedback about whether the one or more users are attracted to the presentation content or distracted from the presentation content. The line graph may be displayed to the meeting host for each group (i.e., each group has its own line graph). For example, where "Group 1" has three users, the normalized attention scores for "User 1," "User 2," and "User 3" may be displayed to the meeting host in the line graph. In this manner, the meeting host may manually modify the presentation content after the online collaborative meeting so that future online collaborative meetings having users with similar profession types and experience levels will be attractive to the one or more users.

According to at least one other embodiment, the provided visual feedback displayed to the meeting host may be displayed along with a snippet of a business profile of the one or more users. The snippet of the business profile may include the experience level and profession type of the one or more users, as well as any awards or badges obtained by the one or more users. In this manner, the meeting host may be able to determine whether the virtual audience resonation is as expected based on the experience level, profession type, and awards or badges of the one or more users.

Referring now to FIG. 3A, a diagram 300 depicting an operational example of statistical information displayed to users in a bar graph during the process in FIG. 2 is shown according to at least one embodiment. The bar graph shows growth trends of educational attainment over four quarters of a given year (e.g., 2010) over "Region 1" and "Region 2" (e.g., east coast of the U.S. and west coast of the U.S., respectively). For example, in "Region 1" for the year 2010 the growth in percentage of individuals who have achieved a bachelor's degree or higher may be as follows: 25% for Q1; 30% for Q2; 59% for Q3; and 142% for Q4. Continuing the example, in "Region 2" for the year 2010 the growth in percentage of individuals who have achieved a bachelor's degree or higher may be as follows: 55% for Q1; 45% for Q2; 81% for Q3; and 48% for Q4.

Referring now to FIG. 3B, a diagram 350 depicting an operational example of statistical information displayed to the users during the process in FIG. 2 upon transformation of the bar graph in FIG. 3A into a line graph is shown according to at least one embodiment. The bar graph depicted in FIG. 3A is remediated (i.e., modified) such that the displayed statistical information is easier to understand for each distracted user. The line graph shows growth trends of educational attainment over five years (e.g., 2008-2012) for the entire country. For example, for the country between 2008 and 2012, the growth in percentage of individuals who have achieved less than a high school diploma may be as follows: 62% for 2008; 60% for 2009; 58% for 2010; 55% for 2011; and 57% for 2012. For the country between 2008 and 2012, the growth in percentage of individuals who have achieved a high school diploma may be as follows: 105% for 2008; 102% for 2009; 98% for 2010; 90% for 2011; and 97% for 2012. For the country between 2008 and 2012, the growth in percentage of individuals who have achieved an associate's degree may be as follows: 141% for 2008; 138% for 2009; 130% for 2010; 125% for 2011; and 127% for 2012. For the country between 2008 and 2012, the growth in percentage of individuals who have achieved a bachelor's degree or higher may be as follows: 168% for 2008; 162% for 2009; 150% for 2010; 142% for 2011; and 147% for 2012.

It may be appreciated that FIGS. 2, 3A, and 3B provide only an illustration of one implementation and do not imply any limitations with regard to how different embodiments may be implemented. Many modifications to the depicted environments may be made based on design and implementation requirements.

Figure 4:
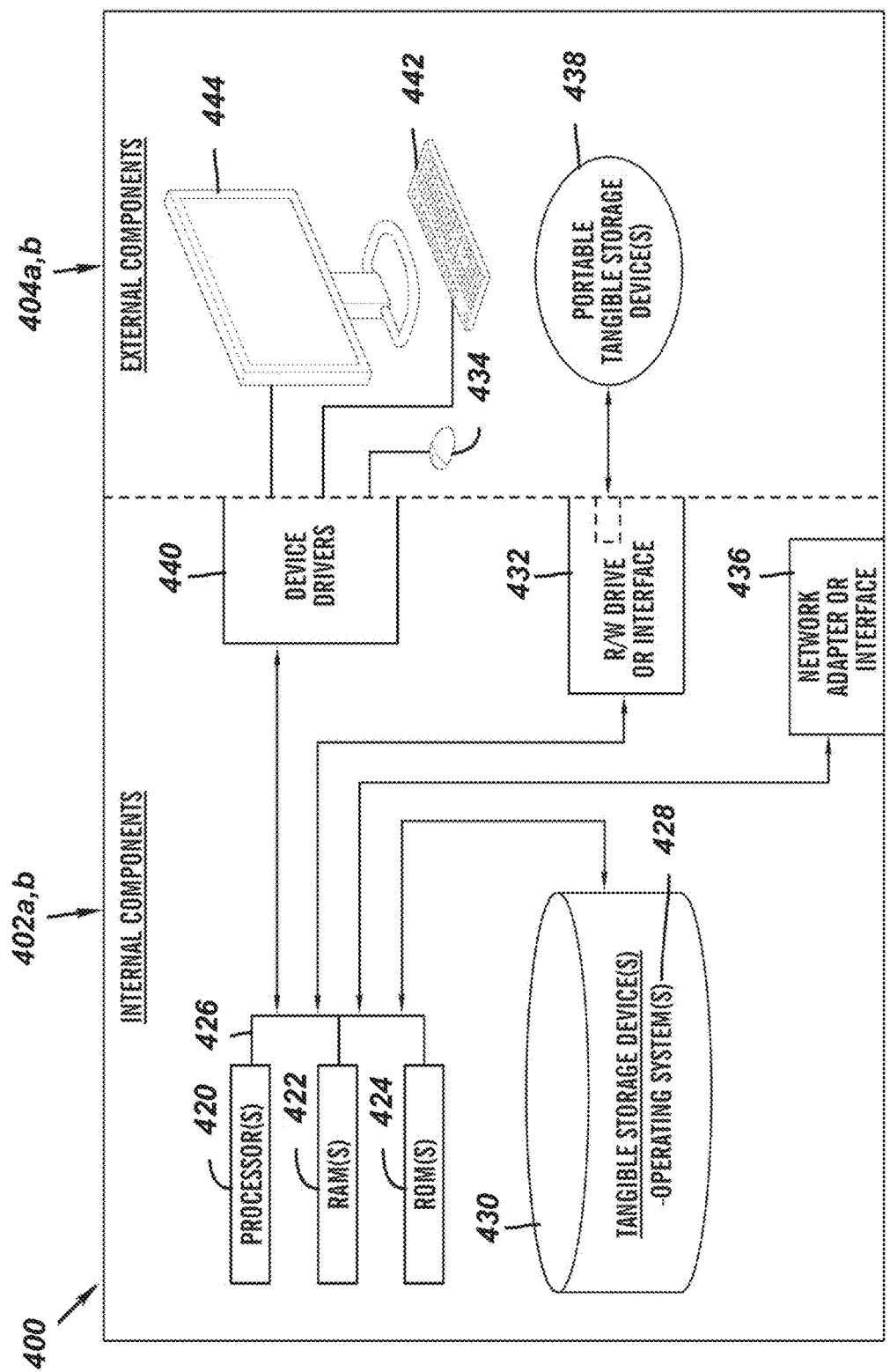
FIG. 4 is a functional block diagram of internal and external components of computers and servers depicted in FIG. 1 according to at least one embodiment.

FIG. 4 is a block diagram 400 of internal and external components of the client computing device 102 and the server 112 depicted in FIG. 1 in accordance with an embodiment of the present invention. It should be appreciated that FIG. 4 provides only an illustration of one implementation and does not imply any limitations with regard to the environments in which different embodiments may be implemented. Many modifications to the depicted environments may be made based on design and implementation requirements.

The data processing system 402, 404 is representative of any electronic device capable of executing machine-readable program instructions. The data processing system 402, 404 may be representative of a smart phone, a computer system, PDA, or other electronic devices. Examples of computing systems, environments, and/or configurations that may represented by the data processing system 402, 404 include, but are not limited to, personal computer systems, server computer systems, thin clients, thick clients, handheld or laptop devices, multiprocessor systems, microprocessor-based systems, network PCs, minicomputer systems, and distributed cloud computing environments that include any of the above systems or devices.

The client computing device 102 and the server 112 may include respective sets of internal components 402 a,b and external components 404 a,b illustrated in FIG. 4. Each of the sets of internal components 402 include one or more processors 420, one or more computer-readable RAMs 422, and one or more computer-readable ROMs 424 on one or more buses 426, and one or more operating systems 428 and one or more computer-readable tangible storage devices 430. The one or more operating systems 428, the software program 108 and the attraction modelling program 110A in the client computing device 102 and the attraction modelling program 110B in the server 112 are stored on one or more of the respective computer-readable tangible storage devices 430 for execution by one or more of the respective processors 420 via one or more of the respective RAMs 422 (which typically include cache memory). In the embodiment illustrated in FIG. 4, each of the computer-readable tangible storage devices 430 is a magnetic disk storage device of an internal hard drive. Alternatively, each of the computer-readable tangible storage devices 430 is a semiconductor storage device such as ROM 424, EPROM, flash memory or any other computer-readable tangible storage device that can store a computer program and digital information.

Each set of internal components 402 a,b also includes a R/W drive or interface 432 to read from and write to one or more portable computer-readable tangible storage devices 438 such as a CD-ROM, DVD, memory stick, magnetic tape, magnetic disk, optical disk or semiconductor storage device. A software program, such as the attraction modelling program 110A, 110B, can be stored on one or more of the respective portable computer-readable tangible storage devices 438, read via the respective R/W drive or interface 432, and loaded into the respective hard drive 430.

Each set of internal components 402 a,b also includes network adapters or interfaces 436 such as a TCP/IP adapter cards, wireless Wi-Fi interface cards, or 3G or 4G wireless interface cards or other wired or wireless communication links. The software program 108 and the attraction modelling program 110A in the client computing device 102 and the attraction modelling program 110B in the server 112 can be downloaded to the client computing device 102 and the server 112 from an external computer via a network (for example, the Internet, a local area network or other, wide area network) and respective network adapters or interfaces 436. From the network adapters or interfaces 436, the software program 108 and the attraction modelling program 110A in the client computing device 102 and the attraction modelling program 110B in the server 112 are loaded into the respective hard drive 430. The network may comprise copper wires, optical fibers, wireless transmission, routers, firewalls, switches, gateway computers and/or edge servers.

Each of the sets of external components 404 a,b can include a computer display monitor 444, a keyboard 442, and a computer mouse 434. External components 404 a,b can also include touch screens, virtual keyboards, touch pads, pointing devices, and other human interface devices. Each of the sets of internal components 402 a,b also includes device drivers 440 to interface to computer display monitor 444, keyboard 442, and computer mouse 434. The device drivers 440, R/W drive or interface 432, and network adapter or interface 436 comprise hardware and software (stored in storage device 430 and/or ROM 424).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
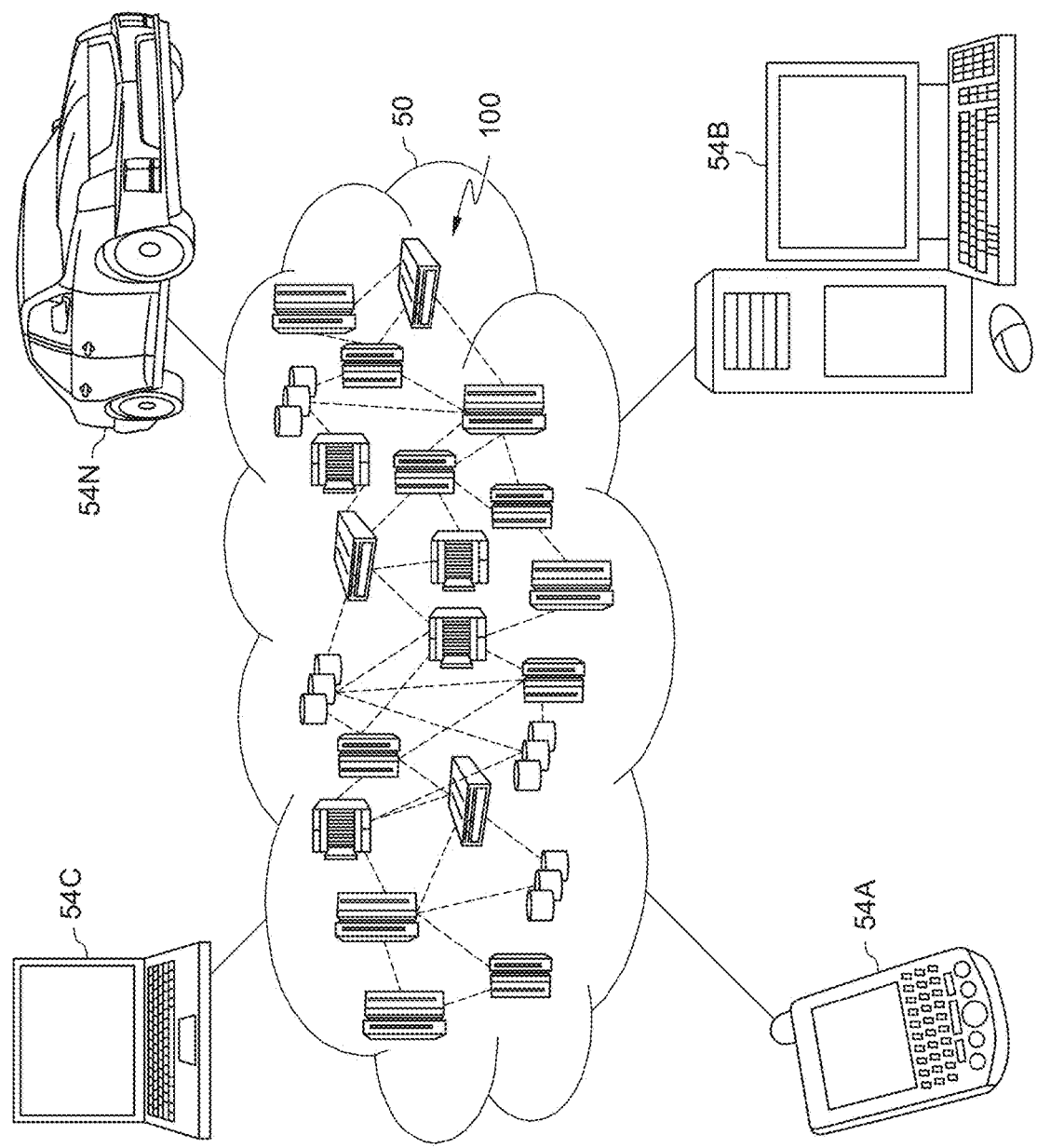
FIG. 5 depicts a cloud computing environment according to an embodiment of the present invention.

Referring now to FIG. 5, illustrative cloud computing environment 50 is depicted. As shown, cloud computing environment 50 comprises one or more cloud computing nodes 100 with which local computing devices used by cloud consumers, such as, for example, personal digital assistant (PDA) or cellular telephone 54A, desktop computer 54B, laptop computer 54C, and/or automobile computer system 54N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 100 and cloud computing environment 50 can communicate with any type of computerized device over any type of network and/or network addressable connection (e.g., using a web browser).

Figure 6:
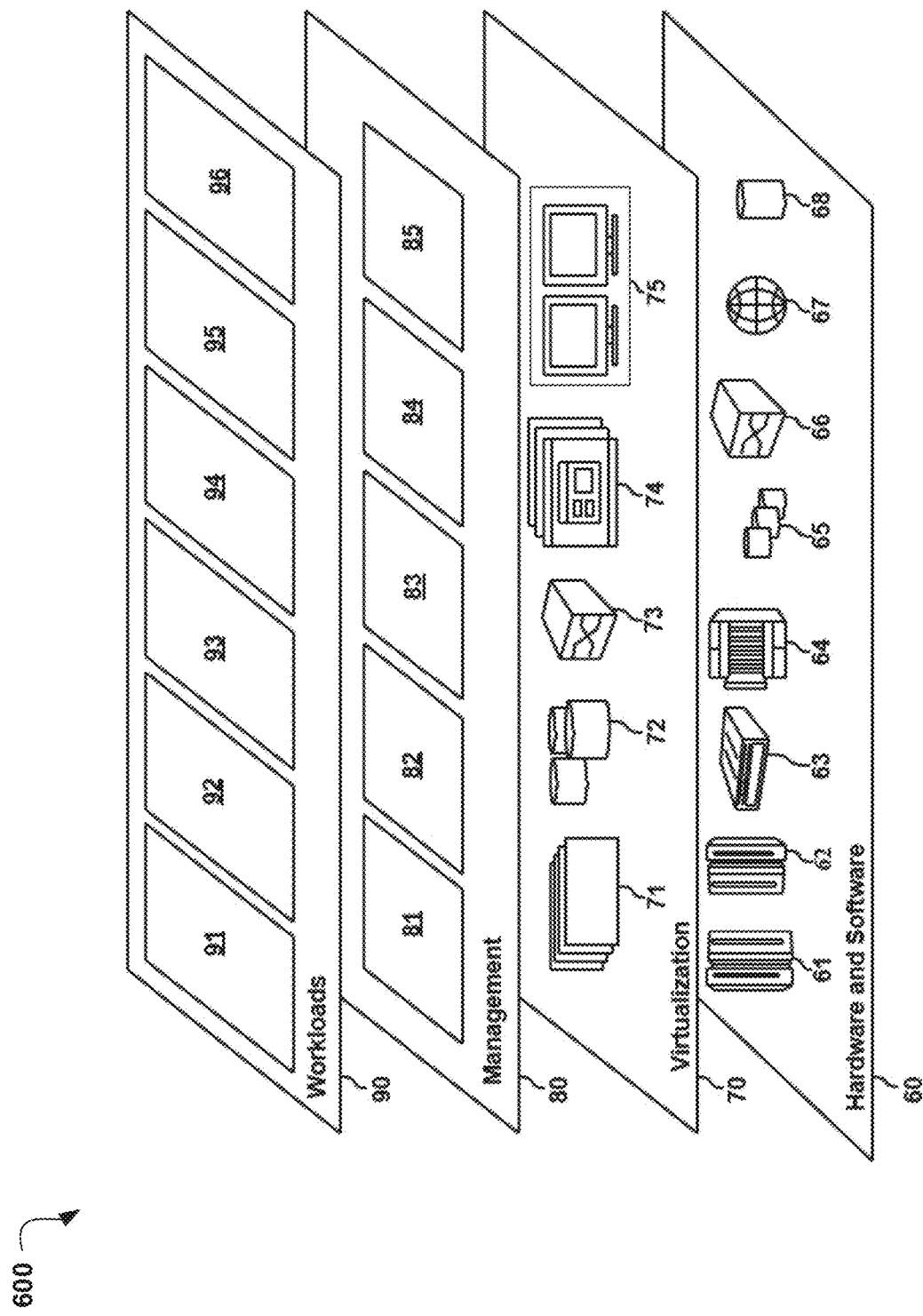
FIG. 6 depicts abstraction model layers according to an embodiment of the present invention.

Referring now to FIG. 6, a set of functional abstraction layers 600 provided by cloud computing environment 50 is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and determining presentation content effectiveness using attraction modeling 96. Determining presentation content effectiveness using attraction modeling 96 may relate to creating an audience attention model based on captured user actions in order to modify a display of presentation content based on characteristics of users belonging to a group.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-based method of determining presentation content effectiveness using attraction modeling, the method comprising:
  receiving presentation content from a meeting host during an online collaborative meeting;
  capturing one or more actions of one or more users during a display of the presentation content to the one or more users, wherein the one or more actions include an eye movement pattern of the one or more users tracked by an augmented reality (AR) device and a context switching by the one or more users detected by a spike in a utilization of one or more applications, wherein the detected spike in the utilization of the one or more applications includes a spike in opening the one or more applications during a pre-defined timeframe;
  determining whether at least one user of the one or more users is distracted from the presentation content based on the at least one user exceeding a threshold distraction level; and
  in response to determining the at least one user is distracted from the presentation content, modifying the display of the presentation content for each distracted user in accordance with one or more characteristics associated with each distracted user.

2. The computer-based method of claim 1, further comprising:
  categorizing the one or more users into one or more groups based on a profession type and experience level of the one or more users; and
  providing visual feedback to the meeting host, wherein the provided visual feedback includes a normalized attention score for each user in the one or more groups.

3. The computer-based method of claim 2, wherein the provided visual feedback is displayed to the meeting host in a line graph.

4. The computer-based method of claim 3, wherein the provided visual feedback displayed to the meeting host is displayed along with a snippet of a business profile of the one or more users.

5. The computer-based method of claim 1, wherein modifying the display of the presentation content for each distracted user further comprises:
  converting a graph of a first type into a graph of a second type based on the one or more characteristics associated with each distracted user.

6. The computer-based method of claim 1, wherein the one or more actions include text entered into a chat window by the one or more users, questions asked by the one or more users, and noises made by the one or more users.

7. The computer-based method of claim 1, wherein the characteristic associated with each distracted user is selected from a group consisting of an experience level of each distracted user, a profession type of each distracted user, and a level of education of each distracted user.

8. A computer system, the computer system comprising:
  one or more processors, one or more computer-readable memories, one or more computer-readable tangible storage medium, and program instructions stored on at least one of the one or more computer-readable tangible storage medium for execution by at least one of the one or more processors via at least one of the one or more computer-readable memories, wherein the computer system is capable of performing a method comprising:
  receiving presentation content from a meeting host during an online collaborative meeting;
  capturing one or more actions of one or more users during a display of the presentation content to the one or more users, wherein the one or more actions include an eye movement pattern of the one or more users tracked by an augmented reality (AR) device and a context switching by the one or more users detected by a spike in a utilization of one or more applications, wherein the detected spike in the utilization of the one or more applications includes a spike in opening the one or more applications during a pre-defined timeframe;
  determining whether at least one user of the one or more users is distracted from the presentation content based on the at least one user exceeding a threshold distraction level; and
  in response to determining the at least one user is distracted from the presentation content, modifying the display of the presentation content for each distracted user in accordance with one or more characteristics associated with each distracted user.

9. The computer system of claim 8, further comprising:
categorizing the one or more users into one or more groups based on a profession type and experience level of the one or more users; and
providing visual feedback to the meeting host, wherein the provided visual feedback includes a normalized attention score for each user in the one or more groups.

10. The computer system of claim 9, wherein the provided visual feedback is displayed to the meeting host in a line graph.

11. The computer system of claim 10, wherein the provided visual feedback displayed to the meeting host is displayed along with a snippet of a business profile of the one or more users.

12. The computer system of claim 8, wherein modifying the display of the presentation content for each distracted user further comprises:
converting a graph of a first type into a graph of a second type based on the one or more characteristics associated with each distracted user.

13. The computer system of claim 8, wherein the one or more actions include text entered into a chat window by the one or more users, questions asked by the one or more users, and noises made by the one or more users.

14. The computer system of claim 8, wherein the characteristic associated with each distracted user is selected from a group consisting of an experience level of each distracted user, a profession type of each distracted user, and a level of education of each distracted user.

15. A computer program product, the computer program product comprising:
one or more computer-readable tangible storage medium and program instructions stored on at least one of the one or more computer-readable tangible storage medium, the program instructions executable by a processor capable of performing a method, the method comprising:
receiving presentation content from a meeting host during an online collaborative meeting;
capturing one or more actions of one or more users during a display of the presentation content to the one or more users, wherein the one or more actions include an eye movement pattern of the one or more users tracked by an augmented reality (AR) device and a context switching by the one or more users detected by a spike in a utilization of one or more applications, wherein the detected spike in the utilization of the one or more applications includes a spike in opening the one or more applications during a pre-defined timeframe;
determining whether at least one user of the one or more users is distracted from the presentation content based on the at least one user exceeding a threshold distraction level; and
in response to determining the at least one user is distracted from the presentation content, modifying the display of the presentation content for each distracted user in accordance with one or more characteristics associated with each distracted user.

16. The computer program product of claim 15, further comprising:
categorizing the one or more users into one or more groups based on a profession type and experience level of the one or more users; and
providing visual feedback to the meeting host, wherein the provided visual feedback includes a normalized attention score for each user in the one or more groups.

17. The computer program product of claim 16, wherein the provided visual feedback is displayed to the meeting host in a line graph.

18. The computer program product of claim 17, wherein the provided visual feedback displayed to the meeting host is displayed along with a snippet of a business profile of the one or more users.

19. The computer program product of claim 15, wherein modifying the display of the presentation content for each distracted user further comprises:
converting a graph of a first type into a graph of a second type based on the one or more characteristics associated with each distracted user.

20. The computer program product of claim 15, wherein the one or more actions include text entered into a chat window by the one or more users, questions asked by the one or more users, and noises made by the one or more users.

* * * * *